No. 609,766. Patented Aug. 30, 1898.
B. W. ASHWELL.
BICYCLE BRAKE.
(Application filed Aug. 4, 1897.)
(No Model.) 2 Sheets—Sheet 1.
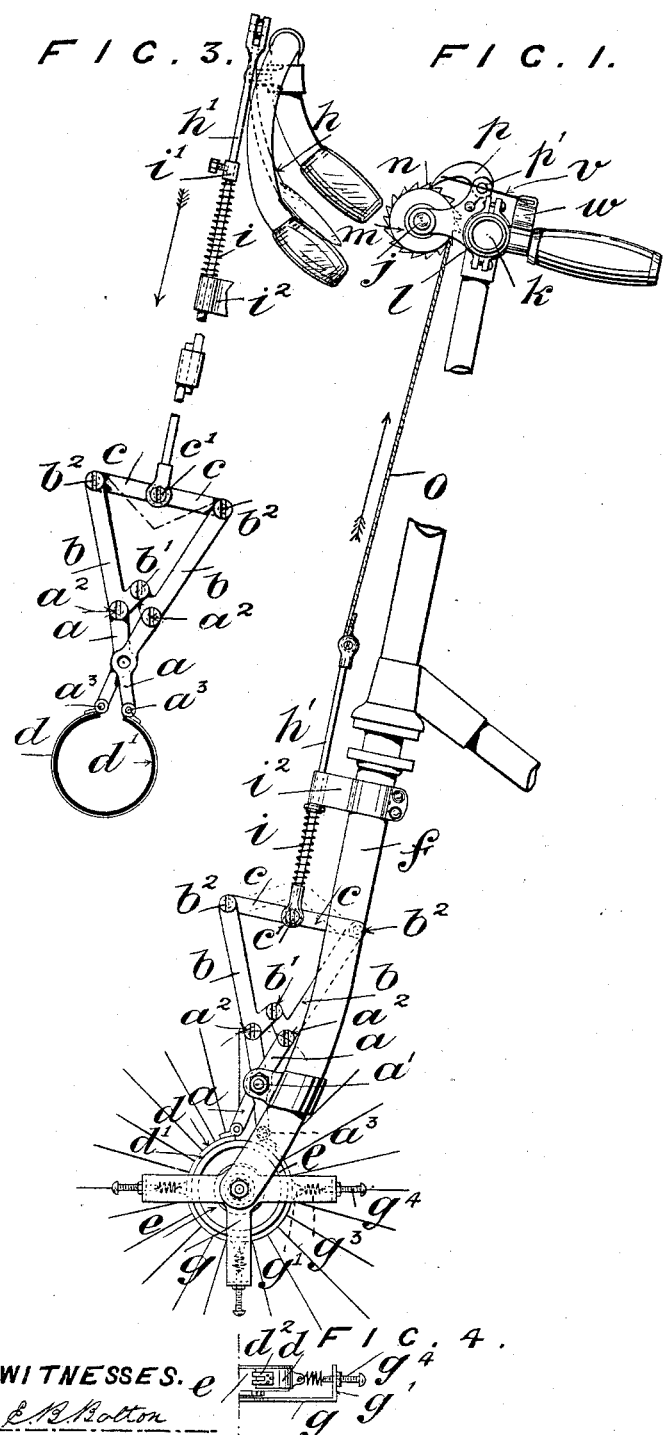
WITNESSES.
E. B. Bolton
Ella L. Giles
INVENTOR.
Benjamin Whalley Ashwell
By Richards
his Attorneys.

No. 609,766. Patented Aug. 30, 1898.
B. W. ASHWELL.
BICYCLE BRAKE.
(Application filed Aug. 4, 1897.)
(No Model.) 2 Sheets—Sheet 2.
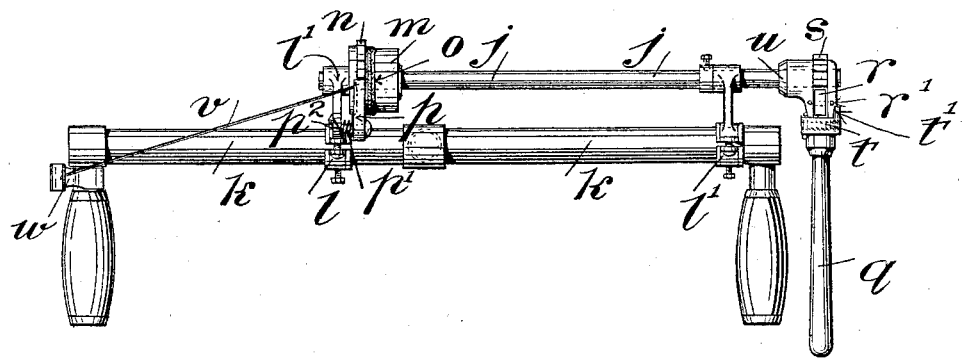
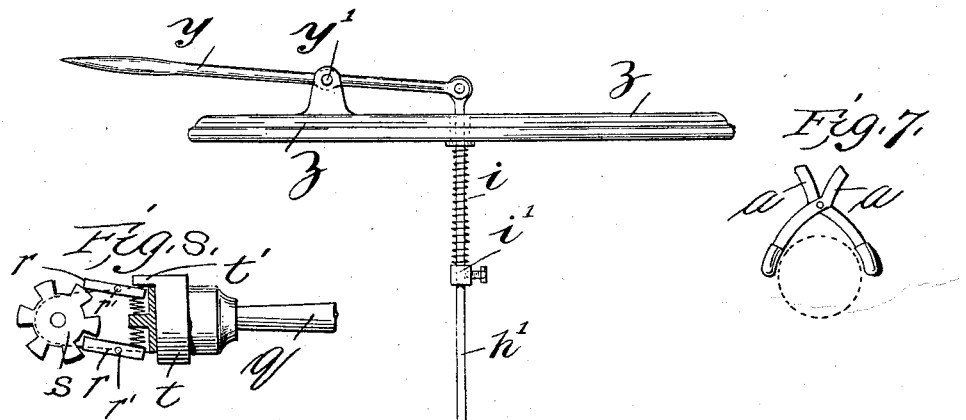
WITNESSES.
INVENTOR.
Benjamin Whalley Ashwell
his Attorneys

UNITED STATES PATENT OFFICE.

BENJAMIN WHALLEY ASHWELL, OF MANCHESTER, ENGLAND.

BICYCLE-BRAKE.

SPECIFICATION forming part of Letters Patent No. 609,766, dated August 30, 1898.

Application filed August 4, 1897. Serial No. 647,116. (No model.) Patented in England October 17, 1896, No. 23,070.

*To all whom it may concern:*

Be it known that I, BENJAMIN WHALLEY ASHWELL, a subject of the Queen of Great Britain, and a resident of Manchester, in the county of Lancaster, England, have invented certain new and useful Improvements in Bicycle-Brakes, of which the following is a specification, the invention having been patented in England under date of October 17, 1896, No. 23,070.

My said invention relates to improvements in braking devices for arresting or retarding revolution, such improvements being applicable as a vehicle-brake or as a brake for machinery.

In order to obtain increased power in applying brakes, I connect the operating handle, lever, or other means to the brake blocks or surfaces by means of interposed compound power-multiplying levers, whereby the force transmitted from the handle or lever is greatly intensified.

My improvements are particularly applicable to hub-brakes for vehicles, the compound levers operating brake clips or straps embracing or surrounding the wheel-hub or a specially-furnished disk or annular braking-surface concentric with the wheel-axis.

By causing the brake to act upon the hub or a disk the brake is rendered very suitable for use with vehicles provided with pneumatic tires, as it is well known that a brake applied to the periphery of such wheels is very severe on the tire and is not always efficient in its action.

The improved brake may be employed to arrest the revolution of parts of machines or to stop machines where an occasional sudden stoppage is a desideratum.

The arrangements I have devised for carrying my invention into effect will be more clearly understood and followed by reference to the annexed two sheets of drawings.

On Sheet 1, Figure 1 shows my improved system of compound levers in conjunction with an encircling strap adapted to act on a drum or disk carried by the hub of a velocipede-wheel, the frame of the velocipede being merely indicated to show more clearly the application of the parts. This figure also shows certain special means I have designed for the purpose of applying or bringing the brake into action and for releasing or taking the same out of action. Fig. 2 is a front elevation of Fig. 1. Fig. 3 illustrates the combination of levers and braking-strap, the levers in this case being operated by the ordinary brake-lever and descending plunger or rod. Fig. 4 is a detail view in plan of an arrangement provided to at once withdraw the encircling strap from contact with the drum when the brake is taken off. On Sheet 2, Fig. 5 is a plan view showing more clearly the special means whereby I might in certain cases actuate the levers. Fig. 6 shows the application of my improved brake to a sewing-machine. Fig. 7 is a detail view showing the use of brake-shoes instead of a strap. Figs. 8, 9, and 10 are detail views relating to the pawl-and-ratchet mechanism for operating the braking mechanism.

Referring first of all to the chief feature of my invention—viz., the interposition of a combination of power-multiplying levers between the braking-surface proper and the brake-actuating means—I will now describe an arrangement of levers suitable for that purpose.

In the combination chosen for illustration six levers or links are employed, there being two levers $a$, two levers $b$, and two levers $c$, all as clearly shown. The two levers $a$ are centered on a fixed stud or pivot, such as $a'$, carried by a bracket from the fork of the velocipede, and are also jointed at $a^2$ to the levers $b$. The levers $b$ are provided with tails, which are pivoted at $b'$, the other ends of the levers $b$ being jointed at $b^2$ to the links $c$, which links are pivoted at $c'$. Now it will be apparent by carefully following the drawings that should the pivot $c'$ be moved either farther from or nearer to the fixed center $a'$ than the position indicated the pivots $b^2$ draw together, those at $a^2$ move apart, and consequently the lower ends of the levers $a$ approach each other to a greater or less extent, according to the movement imparted to $c'$. I connect the lower ends of the levers $a$ to an encircling steel band $d$ (preferably provided with a leather friction-strap $d'$) by means of lugs $d^2$, riveted to the steel band $d$, the levers being pivoted to the lugs $d^2$ by pins $a^3$. Thus any inward movement of the lower ends of the levers $a$ contracts the encircling brake-band $d$, causing the same to grip more or less tightly the drum or disk $e$, carried by the hub of the wheel, so that progress may be almost immediately arrested or merely retarded.

In order to at once remove the strap $d$ from contact with the drum $e$ when the brake is taken off, I prefer to employ means to insure this result, which means may be as follows: I provide a T-shaped bracket $g$, secured to the fork $f$ and formed with turned-in extensions $g'$, between which extensions and lugs $g^2$, carried by the strap $d$, springs $g^3$ extend, the tension of such springs being regulated by screws $g^4$.

Instead of using the strap the lower ends of the levers might be formed as friction-blocks or be provided with shoes or pads or with a braking-surface arranged to bear at times on the revolving disk or part.

The use of the indicated or a similar system of power-multiplying levers to bring into action a braking-surface renders a brake considerably more powerful and certain in its action, so that there is no likelihood of its failing in an emergency. Even should oil or grease get between the strap and disk the increased force available prevents failure of the brake.

The brake may be caused to act or be applied by simply manipulating the ordinary brake-lever $h$, the rod $h'$ and pivot $c'$ in this case descending and at the same time compressing the spring $i$ between the abutment $i'$ and fixing $i^2$. On the handle being released the spring $i$ takes the brake out of action, all as clearly indicated in Fig. 3.

A more elaborate contrivance for putting into and taking the brake out of action is shown in Figs. 1, 2, and 5, perhaps most clearly in Fig. 5. On a short shaft $j$, carried from the handle-bar $k$ in brackets $l\,l'$, I mount a drum $m$, provided with ratchet-teeth $n$, with which teeth a spring-pawl $p$ engages, and between this drum $m$ and the brake-rod $h'$ a stout flexible band or wire $o$—say, for instance, piano-wire—extends. By coiling this band on the drum $m$ the rod $h'$ is raised and the brake applied, the spring $i$ being at the same time compressed, so that on the pawl $p$ being pulled clear away from the ratchet-teeth $n$, the drum and shaft being then free to revolve, the spring draws down the rod $h'$, the band being uncoiled and the brake taken out of action. This action is effected by the spring $i$, aided by the three springs $g^3$. The band $o$ is wrapped upon the drum $m$ by raising the handle $q$, the teeth on the drum slipping under the spring-pawl $p$ as the band is coiled on. When the brake has been applied, to release the drum and band $o$ and render the brake inoperative the spring-pawl $p$, which is loosely carried on the pivot $p'$ from the bracket $l$, is pulled sidewise out of contact with the ratchet-teeth by a wire $v$ against the action of a spring $p^2$, coiled on the pivot $p'$. The wire $v$ is worked by the thumb of the rider from a thumb-spring $w$. On the rider withdrawing his thumb from the spring $w$ the pawl $p$ is shot back into gear with the ratchet by the spring $p^2$ ready for a further application of the brake.

One salient advantage of applying the brake by the means last described would be that the same might be kept in action for any length of time without expenditure of the exertion called forth by a continued application of a brake worked from any ordinary lever-handle and rod, according to the amount of movement imparted to the handle $q$, so that band $d$ is caused to grip more or less tightly the disk $e$.

In order that the handle $q$ may be made to assume any position relatively to the steering-handle to suit the fancy of the rider, I prefer to so construct the handle $q$ as that it may at times be free to turn either in one direction or the other. To this end I mount the handle $q$ loosely on the shaft $j$ and provide the same with two spring detents or triggers $r$, pivoted at $r'$, one detent on either side of the handle. One end of each of these detents is kept constantly pressed into gear with the cog-wheel $s$, fixed on the shaft $j$, by means of a spring applied under the other end. If it is desired at any time to move the handle $q$ in, say, a forward direction upon the shaft $j$, it is only necessary to turn the loose ring $t$ until such time as the wing $t'$ on the ring bears on and presses down the spring end of the upper detent $r$ shown in the drawings, thereby raising the other end clear of the cog-teeth. The detent so raised clear of the cog is for the time being out of action, so that the handle $q$ may be turned without causing the shaft $j$ to revolve. By bringing the wing $t'$ of the ring $t$ to bear on the end of the other detent the handle $q$ may be turned in the opposite direction without interference from the cog-teeth. In the position occupied by the ring $t$ in Fig. 5 any upward movement of the handles $q$ would cause movement of the shaft $j$ and consequent coiling on of the band $o$. The part $u$ is simply a fixed abutment.

Although I have described and illustrated my invention applied to a velocipede, it will be evident that the system of power-multiplying levers might with great benefit be employed to apply the braking-surfaces in vehicles of a much heavier type—such, for instance, as motor-cars, carriages, omnibuses, and the like.

With regard to the application of the brake to machinery, Fig. 6 shows the application of my improved brake to a sewing-machine which might be one of a group all driven by power. Each machine may be provided with a brake, so that any one of the group may be stopped without interfering with the work of the others. Similar letters in this figure indicate similar parts of the brake as described with reference to the other figures. The drum $e$ on which the strap $d$ acts in this case is carried by the crank-shaft $x$ of the sewing-machine. The bracket $g$ is in this case carried from the fixed parts $a^4$. The brake-rod $h'$ is operated by the hand-lever $y$, fulcrumed at $y'$ to the machine-table $z$.

Any of the other hereinbefore-described means could be employed to operate the brake.

I claim—

1. In a brake, the braking-surfaces, a pair of levers $a$, $a$, pivoted at one point and having divergent arms, one end of which arms being connected with the brake-surface, a pair of bell-crank levers $b$, $b$, having their short arms pivoted together and pivoted at the junction of its arms to the levers $a$, $a$, the links $c$, $c$, pivoted to the long arms of the bell-cranks and the operating means pivoted to the links, substantially as described.

2. In combination with a bicycle and its handle-bars, the brake mechanism, the drum having a ratchet and detent, the handle for turning the drum, and the pawl-and-ratchet connection comprising the two pawls operating upon the ratchet and means for rendering either one or the other of said pawls inactive, the said handle being arranged adjacent to the handle-bar of the machine to operate in either direction or to be set in any desired position to suit the taste of the rider, substantially as described.

In witness whereof I have hereunto set my hand in presence of two witnesses.

BENJAMIN WHALLEY ASHWELL.

Witnesses:
ALFRED YATES,
RICHARD IBBERSON.